United States Patent
Skirmont et al.

(10) Patent No.: US 6,553,005 B1
(45) Date of Patent: Apr. 22, 2003

(54) METHOD AND APPARATUS FOR LOAD APPORTIONMENT AMONG PHYSICAL INTERFACES IN DATA ROUTERS

(75) Inventors: David Skirmont, Redwood City, CA (US); Puneet Agarwal, San Francisco, CA (US); Russ Tuck, San Jose, CA (US)

(73) Assignee: Pluris, Inc., Cupertino, CA (US)

( * ) Notice: Subject to any disclaimer, the term of this patent is extended or adjusted under 35 U.S.C. 154(b) by 0 days.

(21) Appl. No.: 09/625,747

(22) Filed: Jul. 26, 2000

(51) Int. Cl.[7] .............................. H04B 3/30; H04L 12/56
(52) U.S. Cl. ...................................... 370/285; 370/389
(58) Field of Search ................................ 370/285, 349, 370/356, 389, 392, 393, 394, 401–402

(56) References Cited

U.S. PATENT DOCUMENTS

| | | | | |
|---|---|---|---|---|
| 5,414,704 A | * | 5/1995 | Spinney ........................ | 370/60 |
| 5,757,795 A | * | 5/1998 | Schnell ........................ | 370/392 |
| 5,946,679 A | * | 8/1999 | Ahuja et al. .................. | 703/3 |
| 5,996,021 A | * | 11/1999 | Civanlar et al. ............. | 709/238 |
| 6,038,230 A | * | 3/2000 | Ofek ........................... | 370/389 |
| 6,044,080 A | * | 3/2000 | Antonov ....................... | 370/401 |
| 6,061,349 A | * | 5/2000 | Coile et al. ................... | 370/389 |
| 6,330,614 B1 | * | 12/2001 | Aggarwal et al. ........... | 709/236 |

* cited by examiner

Primary Examiner—Alpus H. Hsu
Assistant Examiner—Toan Nguyen
(74) Attorney, Agent, or Firm—Donald R. Boys; Central Coast Patent Agency, Inc.

(57) ABSTRACT

A method for routing a packet received in a packet router is taught, the method comprising the steps of selecting a logical interface having multiple physical ports as a destination for the packet, processing any one or more addresses or labels of the packet and other packets received by a common function, producing thereby results unique to the packets in which the addresses and labels processed differ, (c) mapping the physical ports at the destination to the unique results produced by processing the addresses or labels of packets, and (d) routing the data packet according to the mapping. Weighting is applied to physical ports in the mapping, the weighting reflecting different transmission capacities of the ports. Apparatus for practicing the invention is taught as well.

14 Claims, 6 Drawing Sheets

METHOD AND APPARATUS FOR LOAD APPORTIONMENT AMONG PHYSICAL INTERFACES IN DATA ROUTERS

CROSS-REFERENCE TO RELATED DOCUMENTS

The present application is related to U.S. patent application Ser. No. 09/594,300 now U.S. Pat. No. 6,385,209 filed on Jun. 14, 2000, which is titled "Method and Apparatus for Mapping Data Packets Between Lines of Differing Capacity at a Router Interface", the disclosure of which is incorporated by reference.

FIELD OF THE INVENTION

The present invention is in the area of hardware and software for data packet routers, and pertains more particularly to methods for ensuring common physical routing for, in particular, IP packets, and for load balancing in packet routing among physical interfaces.

BACKGROUND OF THE INVENTION

The growth and development of the public network known as the Internet is a very well-known phenomenon. The Internet has grown very rapidly both in terms of end users and content providers. This phenomenal growth has generated a great need for improved hardware and software for handling the greatly increased data traffic.

Hardware-software systems known as routers are the workhorses of the Internet. In current art most routers are capable of handling traffic at rates in the gigabit per second range. The present inventors are engaged in developing Terrabit routers, and in proposing and developing solutions for problems inherent in current art routing systems.

As is well-known in the art, there are several different kinds of packets to be routed in Internet traffic. One type of packet is termed in the art an IP packet. IP packets can be used for all-types of data; including Internet telephony and Internet video streaming. IP packets have header fields defining such as the source and destination for each packet.

In the art of packet routing it is well-known that it is desirable for packets to arrive at a destination in the same order that they were generated at a source. For one reason, out-of-order packets may well cause dropouts in applications such as voice and video communication and the like. Provision may well be made at a destination to re-order packets, but such re-ordering is expensive in processor resources. Such provision is commonly not made, and packets may be lost or discarded in any case.

If there were to be only one hop from a source to a destination, this would not be problem. Since there are invariably several machines through which packets must pass and be processed, and because newer and better routers may employ processing parallelism, attention must be paid to the order of packets.

The packets handled by a router can be logically divided into flows, where each flow is the set of all packets which are being sent from the same origin to the same destination. A group of such flows can be treated as a single flow. Generally speaking, if packets in the same flow are always sent from every system in the order that they were received, the original ordering will be honored. This is therefore an object of the present invention.

Another problem related to the problem of IP packets is a problem of load balancing among multiple physical interfaces. As the number of physical interfaces associated with a router as opposed to the number of virtual, or defined interfaces becomes ever larger the problem of mapping, and IP packets by common routes becomes more difficult, and the problem of efficiently using the capacity of all the physical interfaces grows as well.

In current art when a packet is received at a router the packets headers are read and typically a forwarding table is consulted to determine the next hop for the packet. This next hop table contains, among other things, the identity of the egress interface to be used and how to send the packet internally to that location. A problem in current art is that the egress interface may well be a defined interface comprising several actual physical egress ports. The problem then is one of determining which of the actual physical egress ports to use. One solution is to simply do another software table lookup. This is not difficult for software based routing elements, but is less than ideal for a high-speed hardware based solution where memory space and ASIC pins may well be limited.

What is clearly needed for the new generation of very high-speed and more sophisticated routers is a method and system for mapping IP packets that have common source and destination by strict physical paths, while at the same time accomplishing efficient load balancing along the same physical paths.

SUMMARY OF THE INVENTION

In a preferred embodiment of the invention a method for routing packets in a router to egress ports is provided, the method comprising the steps of (a) using a common characteristic of each packet, choosing a set of egress ports from a table of sets of ports associated with said characteristic; (b) processing any one or more addresses or labels of each packet using a common function, producing thereby a numerical processing result for each packet processed; and (c) using all or a portion of the numerical processing result to select a single egress port for each packet from among the egress ports of the set chosen in step (a).

In some preferred embodiments, in step (a), the common characteristic used for a packet to select a set of egress ports is a destination address for the packet, and in some embodiments the result of step (a) is a pointer to a first address of a sequence of addresses in a stored table wherein the set of egress ports is listed. Also in some embodiments the result of step (b) is an offset, which is added, in step (c), to the address of the pointer to select a single egress port. In some preferred embodiments the addresses or labels processed in step (b) are a source/destination address pair, ensuring thereby that packets of common flow egress by a common egress port.

In some embodiments the common function by which addresses or labels of packets are processed is a hashing function, and some of these embodiments the hashing function result is a binary string, and a default subset of the binary string is used to select an egress port in step (c).

Also in some embodiments, in step (c), weighting is applied to egress ports based on different transmission capacities of the ports, such that packets having different processing results in step (b) may none-the-less be routed to a single, higher-capacity port, providing thereby load-balancing between egress ports. In some other embodiments the data packets are MPLS packets, and in step (b), the processing is accomplished on one or more labels in the label stack of individual ones of the MPLS packets. In some cases individual ones of the egress ports have different transmission capacity, and the transmission capacity of a port having the lowest transmission capacity is considered a least denominator, then ports having higher transmission capacity than the least denominator are assigned a whole number multiplier according to a capacity ratio, and the multipliers are used in the routing to ensure that ports having higher capacity are fully utilized.

In another aspect of the invention a packet router is provided, comprising ingress and egress ports; and control circuitry for processing and routing packets. The router is characterized in that the control circuitry uses a common characteristic of each packet to choose a set of egress ports from a table of sets of ports associated with said characteristic, processes one or more addresses or labels of each packet using a common function, producing thereby a numerical processing result for each packet processed, and uses all or a portion of the numerical processing result to select a single egress port for each packet from among the egress ports of the set chosen.

In some preferred router embodiments the common characteristic used for a packet to select a set of egress ports is a destination address for the packet, and in some of these embodiments the result of table lookup is a pointer to a first address of a sequence of addresses in a stored table wherein the set of egress ports is listed. In these cases the processing by a common function produces an offset, which is added to the first address to select a single egress port.

In some embodiments the addresses or labels processed are a source/destination address pair, ensuring thereby that packets of common flow egress by a common egress port. In some of these embodiments the common function by which addresses or labels of packets are processed is a hashing function. The hashing function result may be a binary string, and a default subset of the binary string is used to select an egress port.

In some embodiments weighting is applied to egress ports based on different transmission capacities of the ports, such that packets having different processing results may none-the-less be routed to a single, higher-capacity port, providing thereby load-balancing between egress ports. In some other embodiments the data packets are MPLS packets, and the processing is accomplished on one or more labels in the label stack of individual ones of the MPLS packets. In some cases individual ones of the egress ports may have different transmission capacity, so the transmission capacity of a port having the lowest transmission capacity is considered a least denominator, ports having higher transmission capacity than the least denominator are assigned a whole number multiplier according to a capacity ratio, and the multipliers are used in the routing to ensure that ports having higher capacity are fully utilized.

In yet another aspect of the invention a method for routing packets in a packet router having a plurality of candidate egress ports for individual ones of the packets is provided, comprising steps of (a) mapping sets of candidate egress ports to a common characteristic of individual packets; (b) mapping individual ports in each set to a result of processing one or more addresses or labels of individual ones of packets to be routed by a common function; (c) selecting a set of candidate ports for each packet to be routed by consulting the common characteristic; and (d) selecting a single egress port from the selected set by the result of the processing by a common function the one or more addresses or labels of each packet.

In embodiments of the invention described in enabling detail below as examples, for the first time a system for routing packets among individual ones of sets of egress ports is provided, assuring that packet flows follow common paths and loads are balanced among the ports.

DESCRIPTION OF THE PREFERRED EMBODIMENTS

Figure 1:
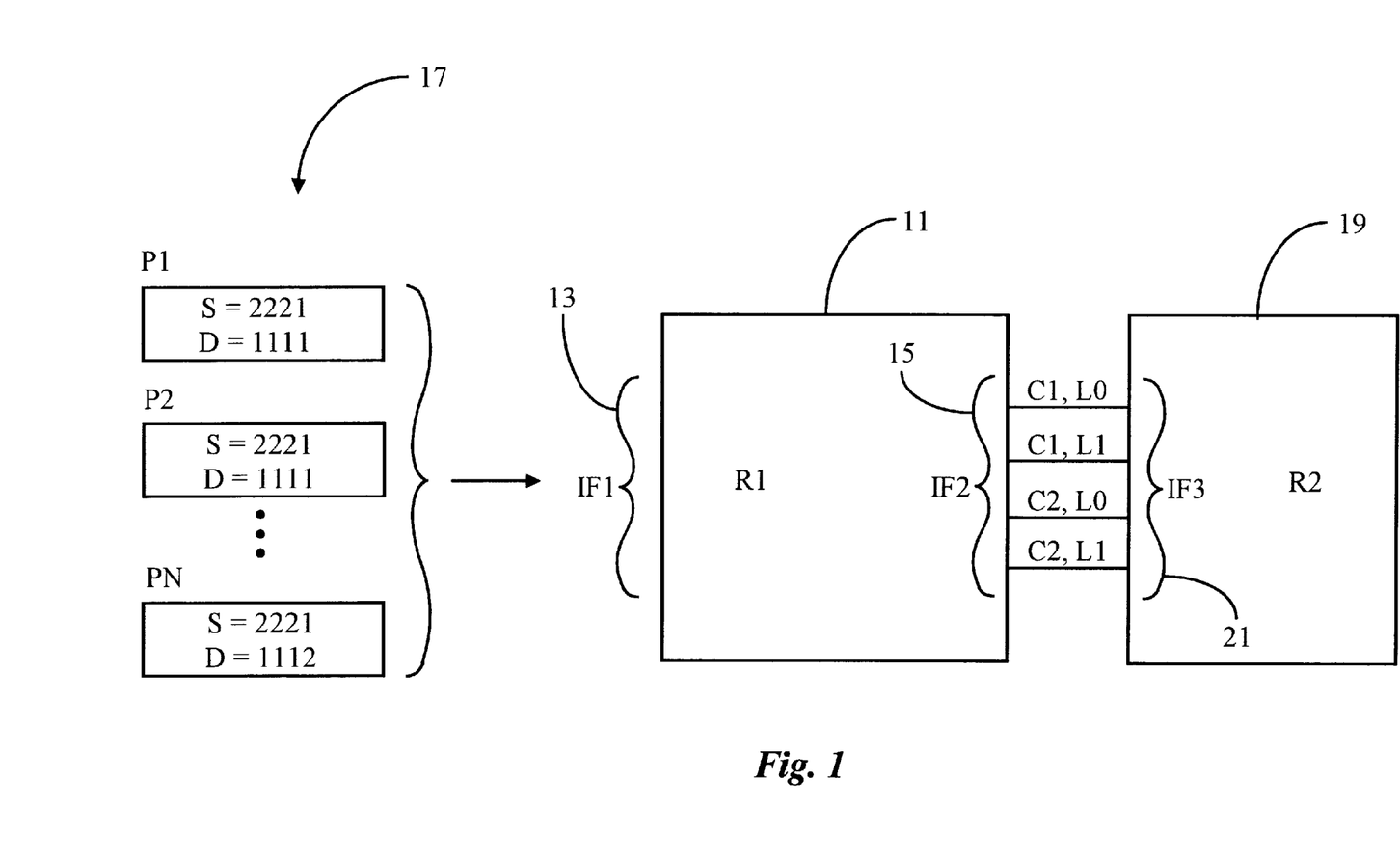
FIG. 1 is a block diagram illustrating packet processing in an embodiment of the present invention.

FIG. 1 is provided as an aid for describing the preferred embodiment of the present invention. In FIG. 1 a first router 11 is illustrated as having two logical interfaces. A first interface 13, labeled IF1 is considered as receiving data packets which will be processed and sent to an egress interface 15, labeled IF2. Incoming packets 17 are illustrated as each having a source and a destination header field (address). These are packets labeled P1 through Pn. Notice that in the illustration all of the packets represented have the same source address. Two of the packets have the same destination address, and one of the packets has a different destination address. All packets are shown as arriving at interface one of router R1, although there will typically be many more than one ingress interface. The same is true of egress interface IF2. That is, there will typically be many more than one egress interface, and most interfaces will act in both capacities. The internal interconnections and control functions managing these interconnections, known in the art as the internal fabric, is not shown. The simple schematic shown, however, is adequate for describing this embodiment of the present invention.

A second router 19, labeled R2, is shown as connected by four lines between an interface 21, labeled IF3, to interface IF2 at router one. In this example it is assumed that all packets received at IF1 will be routed on first hop to interface IF2 for egress. In some typical cases interface IF2 is a line card having four physical ports. It is not required, however, that a logical interface be limited to a single line card. In this particular example there are four physical ports associated with interface IF2, but these ports are on two cards C-1 and C2. The four lines between IF2 on router R1 and IF3 on router two are labeled card 1, line 0; card 1, line 1; card 2, line 0; and card 2, line 1.

It will be apparent to the skilled artisan that IP packets having a source and a destination address are not the only packets that will typically be received and forwarded by a router such as router R1. There may also be other packets, such as MPLS packets having labels rather than source and destination addresses, and such packets may also be routed in embodiments of the present invention, and this operation will also be described below. Routing of IP packets, however, is sufficient to describe practice of the present invention in this preferred embodiment.

Figure 2:
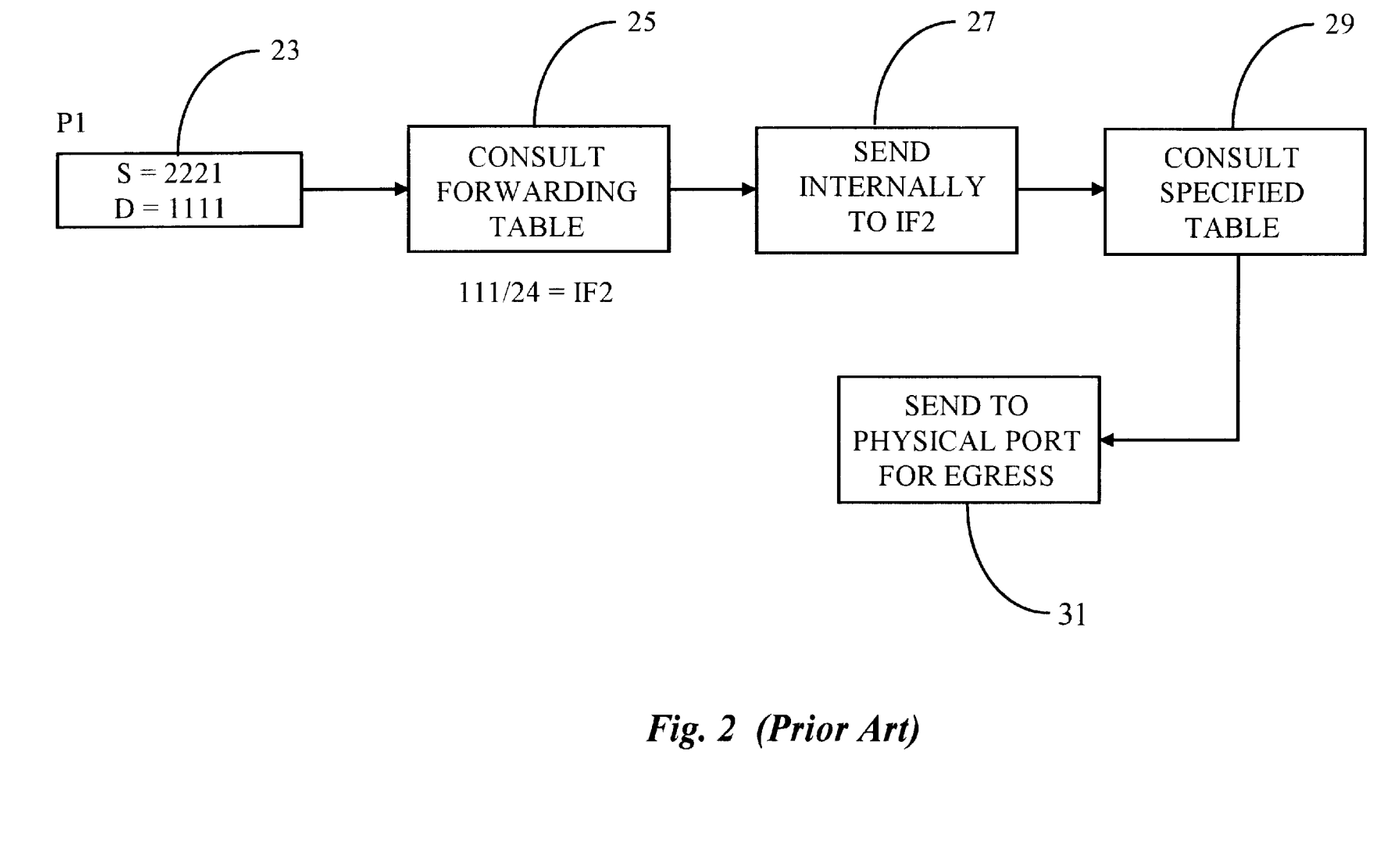
FIG. 2 is a logic flow diagram illustrating packet transfer steps in the prior art.

FIG. 2 is a simplified flow diagram showing a first packet 23 being conducted to a physical egress port according to current art. Firstly, the system of router R1 notes the destination address, and consults a forwarding table. The forwarding table may have a number of logical destinations suitable for the destination address of this first packet. A process termed "longest prefix match" is typically used to select the most suitable first hop destination. In this case the table lookup indicates a first top destination for interface IF2. At step 27 the system of router R1 sends the packet to interface IF2. At this point the question of the correct physical egress port is still unanswered. One solution in the prior art is to do a second table lookup from a specialized table which relates to all of the physical ports associated with interface IF2. This operation is shown as step 29. As a result of the second lookup the packet is sent to the finally selected physical port.

The process described above with the aid of FIG. 2 is software intensive, and is not a good solution for new, high-speed, routers. The present inventors propose and teach herein apparatus and method for routing such packets directly to physical egress ports in a manner that assures a rigid physical path for IP packets having a common source and destination address, and which are therefore part of the same flow. The apparatus and method of the invention also accomplishes efficient load balancing.

Figure 3:
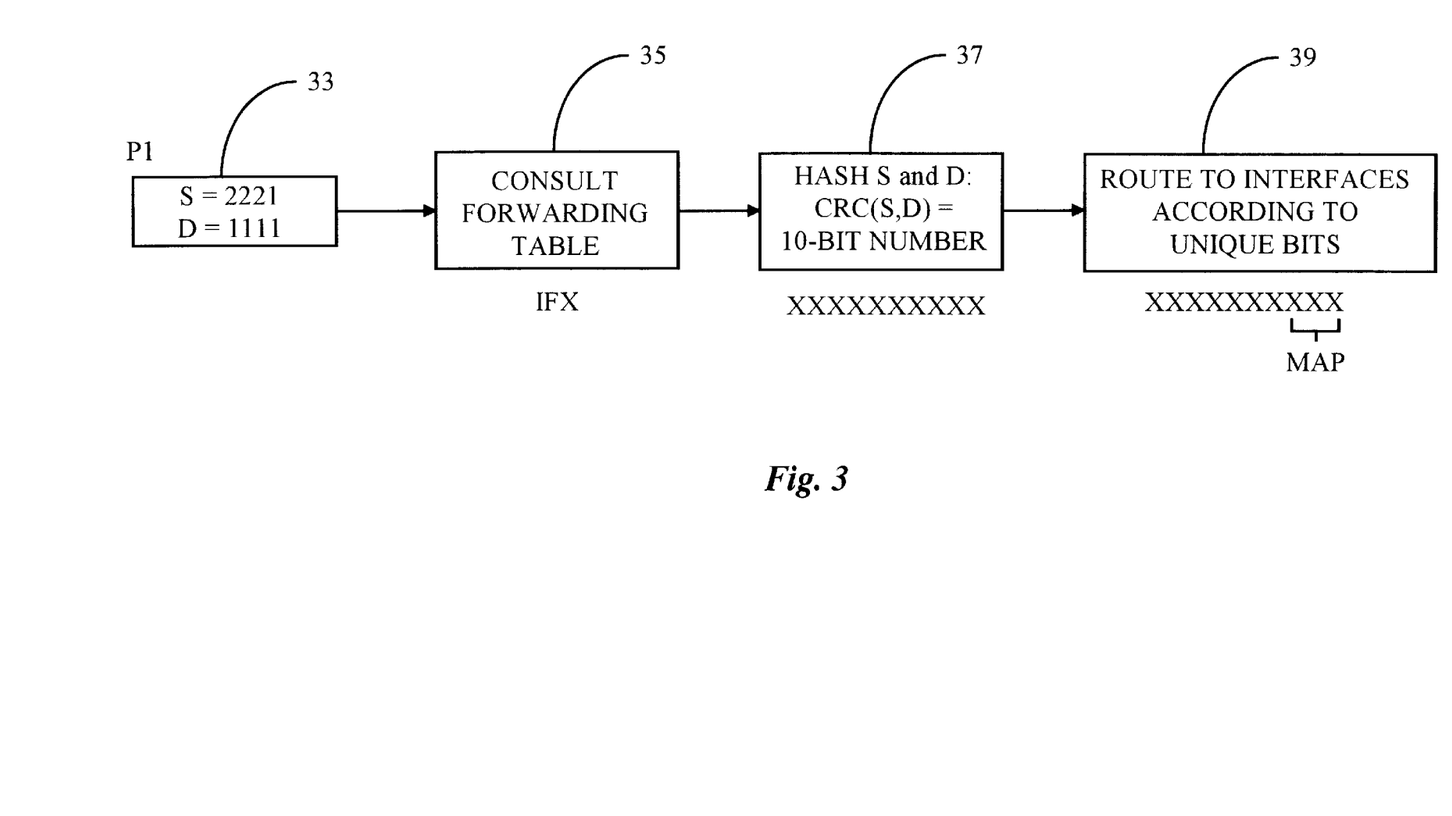
FIG. 3 is a flow diagram illustrating packet processing in an embodiment of the present invention.

FIG. 3 is a simplified flow diagram illustrating routing directly to physical interfaces according to a preferred embodiment of the present invention. An arriving packet, in this case packet P1, is shown at step 33. At step 35 the destination address is used in conjunction with the forwarding table to determine the logical interface for the first hop, as in the prior art example above. The result in this case the shown as IFx. Now the system of the invention, at step 37, performs a hashing function using both the source and the destination addresses. There are in the art a number of functions that might be used. One such function is known in the art as a CRC function. In this example a CRC-10 function, CRC meaning cyclic redundancy check, is used with both the source and destination address to produce a unique 10 bit number. The unique 10 bit number is shown as a string of x's below step 37. As the physical mapping of physical ports to logical ports is known, at this point the system knows the number and identification of the physical ports associated with the logical port determined by the forwarding table lookup at step 35. For the present example these are the four ports shown for IF2 and FIG. 1. For four ports only two bits of the unique 10 bit number from step 37 are needed. In this example the least significant two bits are used. This is a convenience, as any two bits could be used. One physical port is associated with each combination of the two selected bits, and the packet is sent to the physical port associated by the two selected bits.

It will be apparent to the skilled artisan that the system described with reference to FIG. 3 could map a great number of physical ports to each logical interface. It will also be apparent that every packet having the same source and destination address pair will be sent to exactly the same physical egress port. Reordering problems due to common packets taking variant physical paths are now completely eliminated. Assuming also that the physical ports each have the same transmission capacity, efficient load balancing is also accomplished. These assumptions are particularly convenient for one situation well-known to the present inventors. This is a situation where the logical interface may be a line card having four physical ports, with each port having the same transmission capability. In this situation the physical port mapping may be conveniently implemented largely in hardware on the line card.

There are, of course, situations wherein physical ports mapped to logical interfaces will not each have the same transmission capacity. The simple solution in this case is to provide more bits in the result of the hashing function for those physical ports that have higher capacity. For example, in a case of a logical interface having four physical ports, three of which are 2.5 gigabit ports, and one of which is a 10 gigabit port, one would need seven unique mappings. One would therefore need to use three bits of the 10 bit hashing result (capable of identifying up to eight unique mappings) to map packets among the four ports. One unique combination of the three bits would be assigned to each of the 2.5 gigabit ports, and four unique combinations of the three bits would be assigned to the 10 gigabit port. One might make an analogy of buckets into which packets are dumped according to the processing of this embodiment of the invention. In this case there are seven 2.5 gigabit buckets, four of which are assigned to the 10 gigabit port, and one bucket is assigned to each of the 2.5 gigabit ports. The result is still that IP packets with unique source/destination address pairs are routed by unique physical paths, and efficient load balancing is still accomplished.

In this example of four bits and seven destinations, there is a bit pattern left over, and, since the destination is selected by the result of the hashing function in the four bits, there needs to be a destination for the eighth bit combination (every packet has to have a destination). In this case a good choice is to map the eighth combination to the 10.0 gigabit port (which now has five bit combinations), to provide a good approximation for load balancing.

There are alternatively a number of ways the mapping may be done. In the case where the number of choices is a power of 2, the binary bits solution works very well. If there are fewer choices than the number of bit combinations, then the otherwise unused combinations need to be mapped to redundant destinations, as was described above for four bits (eight combinations) and seven physical destinations. For better approximation, one may use additional bit(s) and assign the right fraction of their values to each port.

In an alternative embodiment a mathematical division is required, where the hash value is divided by the number of choices (already weighted as shown above to reflect ratio of speeds) and the remainder is used to select a choice. This gives a more precise allocation of packets. In yet another embodiment there may be some other approximation of division, using any approximation of division or remainder known in the art.

Figure 4:
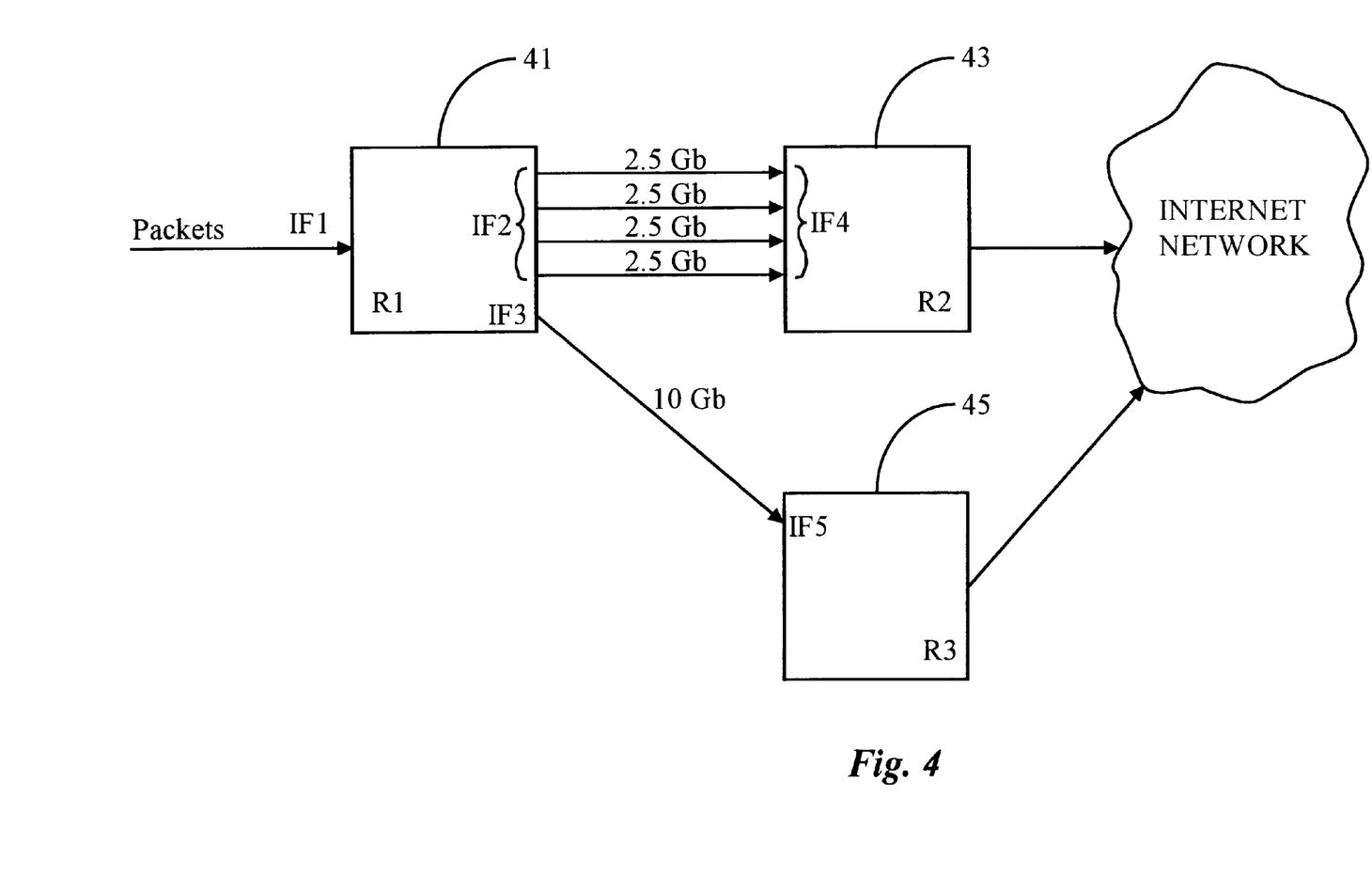
FIG. 4 is a block diagram showing a configuration in an embodiment of the present invention.

In another aspect of the invention, shown schematically in FIG. 4, there may be a choice to be made between two logical interfaces at the same router, and the two or more interfaces may connect to the same or two different downstream routers. In FIG. 4 a first router 41 as a logical interface IF1 receiving packets and two egress interfaces IF2 and IF3 are shown. IF2 connects by four lines to IF4 at a second router 43, and each of these lines has 82.5 gigabit transmission capacity. IF3 connects by a single 10 gigabit capacity line to a third router 45 at interface IF5.

In this example the forwarding table regards IF2 and IF3 as exactly equal, and the longest prefix match returns both IF2 and IF3. The solution in this case is similar to the solution described above for one logical interface having physical ports of differing capacity. It is necessary in this case to accomplish the hashing operation prior to packets reaching the egress interfaces. In this case the solution requires eight buckets, which can be accomplished by three bits of the unique 10 bit hashing result. Four buckets are assigned to IF3, and four more buckets, one each to the four physical ports associated with IF2. This is a solution applicable to equal cost routing.

Figure 5:
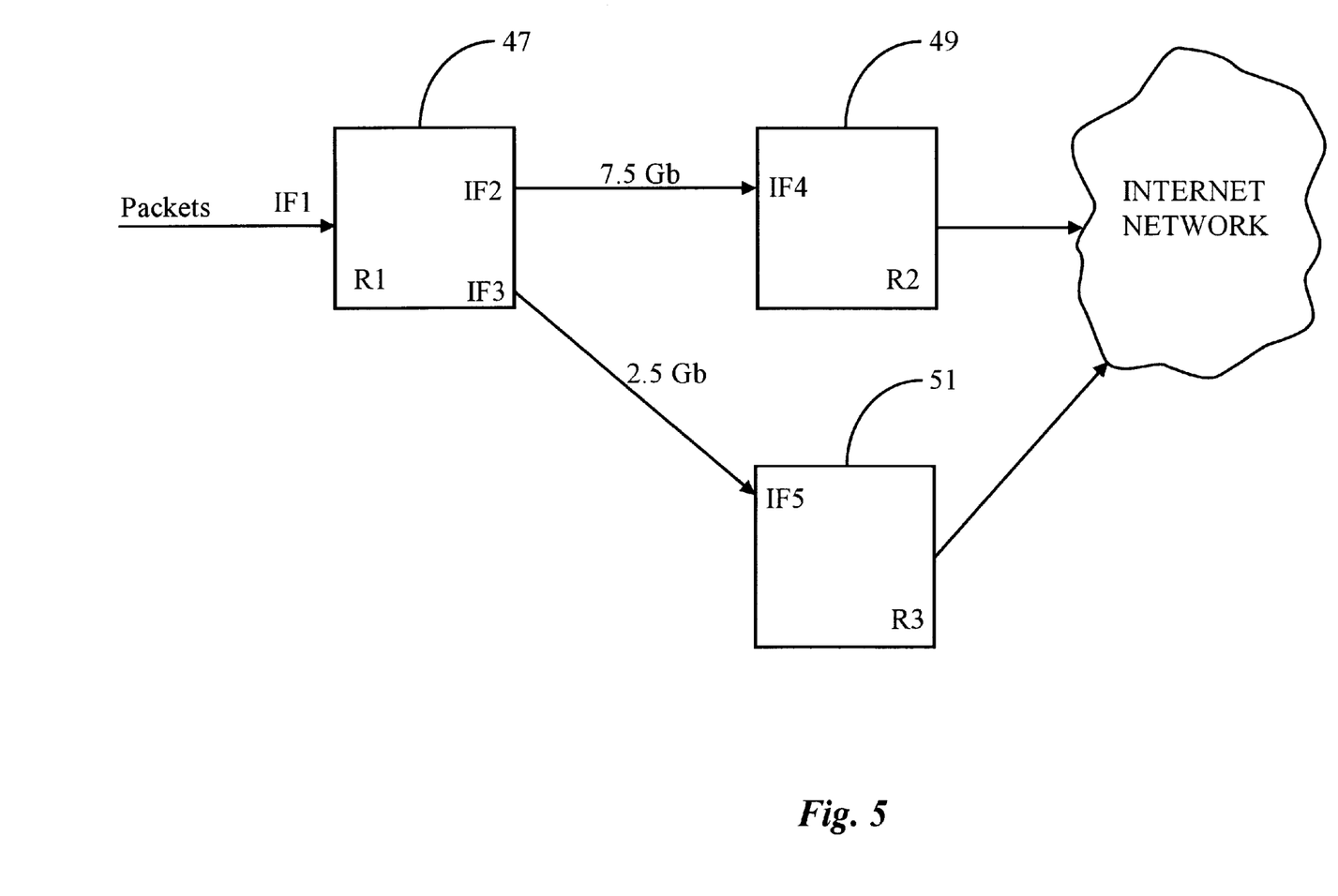
FIG. 5 is a block diagram showing another configuration in an embodiment of the present invention.

In a situation involving non-equal cost routing, a shown in FIG. 5, embodiments of the present invention are still applicable, and still provide latency solution and load balancing. In FIG. 5 a first router 47 has in ingress interface IF1 and two egress interfaces IF2 and IF3. IF2 connects by a 7.5 gigabit line to an interface IF4 at a second router 49. IF3 connects by a 2.5 gigabit line to a third router 51. The solution in this case requires four buckets representing 2.5 gigabit capacity each. Three of the buckets are dedicated to the 7.5 gigabit line between routers 47 and 49, and one bucket is dedicated to the 2.5 gigabit line between router 47 and router 51. The latency solution and load balancing solution are still intact.

Figure 6:
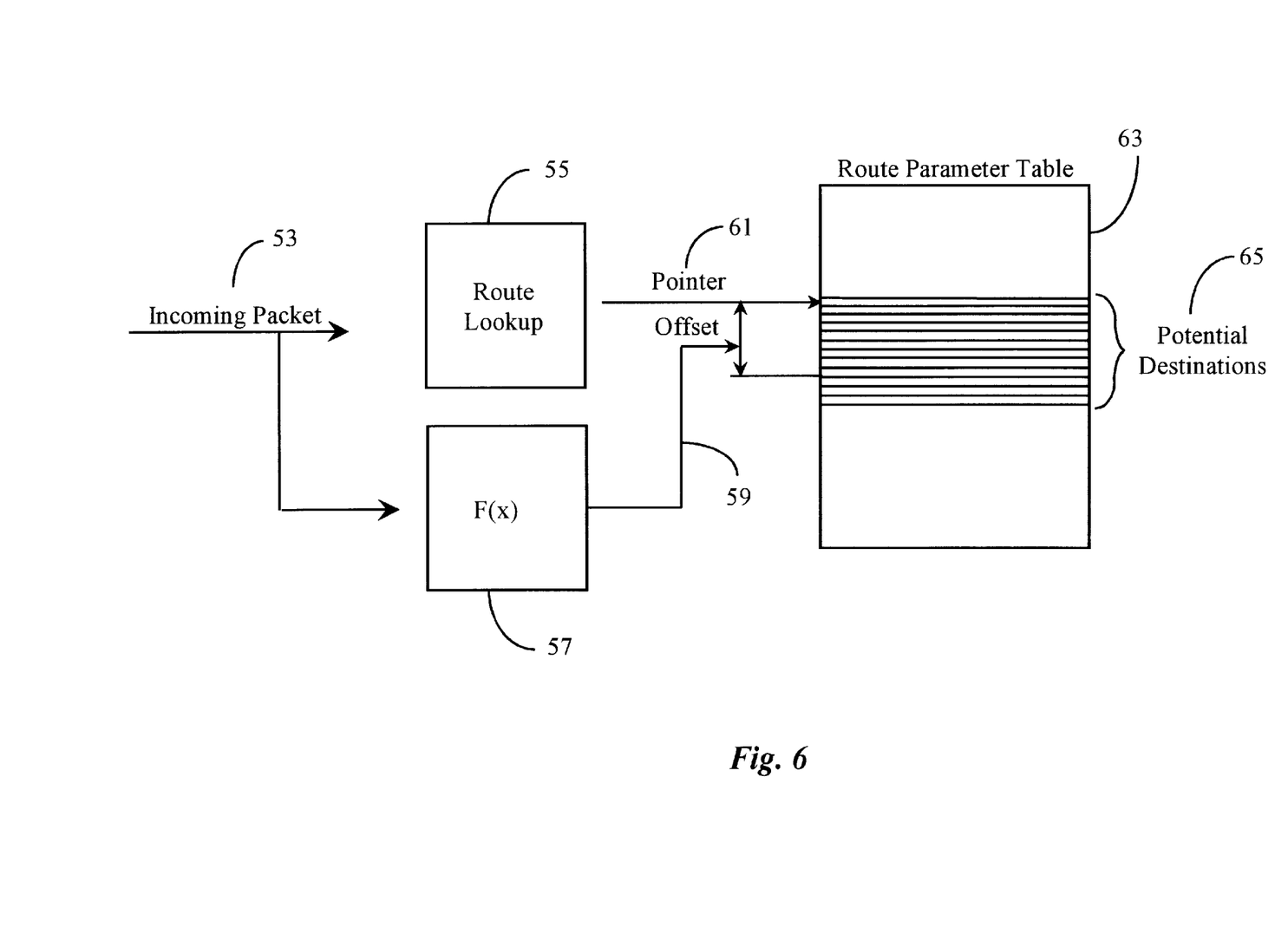
FIG. 6 is a schematic diagram illustrating practice of the present invention in a preferred embodiment.

There are a wide variety of arrangements of hardware and software that may be used in practice of the present invention, which is useful to select a physical port among a plurality of physical ports to which a packet may be routed in a router. FIG. 6 is a schematic diagram illustrating practice of the invention in one preferred embodiment. In this example an incoming packet 53 triggers a routing process, as is common in any router. Element 55 in this diagram represents a route lookup. In conventional routers this lookup determines the final destination for an incoming packet.

In routers under development at the time of the present patent application by the present inventors and others, a route lookup as represented by element 55 in FIG. 6 may be used to select a set of potential destinations for a packet in process, rather than a single destination. There may be, for example, several physical ports to which a packet may be sent, all more-or-less equivalent. The route lookup is typically done by a mapping of final destination address for a packet to an updated route table, which associates internal egress ports with final destinations.

In this example potential egress ports are represented in a route parameter table, and the lookup at 55 produces a pointer 61 to a first port in a set 65 of potential egress ports. Set 65 of potential egress ports in table 63 is but one of a plurality of such sets listed sequentially in the parameter table. By default, the lookup 55 produces a pointer to the first one of the ports in the set.

In the processing of incoming packet 53, certain addresses or labels, typically accompanying the packet as header fields, are, in a preferred embodiment of the invention, acted upon by a common function shown as F(x) in element 57. This function may be a hashing function. All or a portion of the result of the application of F(x) is then used as an offset to pointer 61 to select one among the several ports in set 65 as a local destination for packet 53. For example, a hashing function may be used at process 57 to process a binary number that is the binary sum of the source and destination addresses of packet 53, producing a 32-bit binary result. By design, in this example, the most significant 4 bits of the processing result may be used as offset 59, added to pointer 61, to select one of the destinations of set 63 for the packet. Four bits provides an offset from 0 to 16 in numerical value. By default in the processing, if there are fewer than 16 different ports in set 65, some offsets values are mapped to more than one port.

It will be apparent to the skilled artisan that every packet arriving having a common flow (same source and destination), will, by this scheme, be routed by the same egress port, and that design in mapping may also be used for load balancing.

It will be apparent to the skilled artisan that the examples presented as embodiments of the present invention above are relatively simple, and in real routers there are many more interfaces and ports than those described herein. The simple schematics, however, presented herein are sufficient to describe the system and practice of the present invention. It is quite true that physical ports in routers may both transmit and receive packets, and inventors herein have described primarily one-way operation. This is a convenience only, and not a limitation the invention. The method may also be generalized to the case of MPLS packets for which hashing may be done on, for example, the top label or the top two labels, and for any case of such packets being routed and apportioned to equipment and elements of equipment having different traffic capacity. The invention must be accorded the breadth of the claims which follow.

What is claimed is:

1. A method for routing packets in a packet router having a plurality of candidate egress ports for individual ones of the packets, the method comprising the steps of:

(a) using a common characteristic of each packet, choosing a set of egress ports from a table of sets of ports associated with said characteristic;

(b) processing a source/destination address pair of each packet using a hashing function, producing thereby a binary string result for each packet processed; and (c) using a default subset of the binary string result to select a single egress port for each packet from among the egress ports of the set chosen in step (a), ensuring thereby that packets having common source/destination address pairs egress by a common egress port.

2. The method of claim 1 wherein, in step (a), the common characteristic used for a packet to select a set of egress ports is a destination address for the packet.

3. The method of claim 2 wherein the result of step (a) is a pointer to a first address of a sequence of addresses in a stored table wherein the set of egress ports is listed.

4. The method of claim 3 wherein the result of step (b) is an offset, which is added, in step (c), to the address of the pointer to select a single egress port.

5. The method of claim 1 wherein, in step (c), weighting is applied to egress ports based on different transmission capacities of the ports, such that packets having different processing results in step (b) may none-the-less be routed to a single, higher-capacity port, providing thereby load-balancing between egress ports.

6. The method of claim 1 wherein the data packets are MPLS packets, and in step (b), the processing is accomplished on one or more labels in the label stack of individual ones of the MPLS packets.

7. The method of claim 1 wherein individual ones of the egress ports have different transmission capacity, the transmission capacity of a port having the lowest transmission capacity is considered a least denominator, ports having higher transmission capacity than the least denominator are assigned a whole number multiplier according to a capacity ratio, and the multipliers are used in the routing to ensure that ports having higher capacity are fully utilized.

8. A packet router, comprising:

ingress and egress ports; and control circuitry for processing and routing packets;

characterized in that the control circuitry uses a common characteristic of each packet to choose a set of egress ports from a table of sets of ports associated with said characteristic, processes source/destination address pair of each packet using a hashing function, producing thereby a binary string processing result for each packet processed, and, and wherein a default subset of the binary string is used to select a single egress port for each packet from among the egress ports of the set chosen, ensuring thereby that packets of common flow egress by a common egress port.

9. The router of claim 8 wherein the common characteristic used for a packet to select a set of egress ports is a destination address for the packet.

10. The router of claim 9 wherein the result of table lookup is a pointer to a first address of a sequence of addresses in a stored table wherein the set of egress ports is listed.

11. The router of claim 10 wherein the processing by a hashing function produces an offset, which is added to the first address to select a single egress port.

12. The router of claim 8 wherein weighting is applied to egress ports based on different transmission capacities of the ports, such that packets having different processing results may none-the-less be routed to a single, higher-capacity port, providing thereby load-balancing between egress ports.

13. The router of claim 8 wherein the data packets are MPLS packets, and the processing is accomplished on one or more labels in the label stack of individual ones of the MPLS packets.

14. The router of claim 8 wherein individual ones of the egress ports have different transmission capacity, the transmission capacity of a port having the lowest transmission capacity is considered a least denominator, ports having higher transmission capacity than the least denominator are assigned a whole number multiplier according to a capacity ratio, and the multipliers are used in the routing to ensure that ports having higher capacity are fully utilized.

* * * * *